(12) United States Patent
Chen et al.

(10) Patent No.: US 6,946,112 B2
(45) Date of Patent: Sep. 20, 2005

(54) METHOD FOR REVERSIBLE STORAGE OF HYDROGEN AND MATERIALS FOR HYDROGEN STORAGE

(75) Inventors: Ping Chen, Singapore (SG); Zhitao Xiong, Singapore (SG); Jizhong Luo, Singapore (SG)

(73) Assignee: National University of Singapore, Singapore (SG)

(*) Notice: Subject to any disclaimer, the term of this patent is extended or adjusted under 35 U.S.C. 154(b) by 152 days.

(21) Appl. No.: 10/286,924

(22) Filed: Oct. 31, 2002

(65) Prior Publication Data

US 2003/0129126 A1 Jul. 10, 2003

Related U.S. Application Data

(60) Provisional application No. 60/330,802, filed on Oct. 31, 2001.

(51) Int. Cl.[7] .................................................. C01B 6/00
(52) U.S. Cl. ...................... 423/645; 423/658.2; 422/211
(58) Field of Search ................................ 423/645, 646, 423/658.2; 422/211

(56) References Cited

PUBLICATIONS de Cori, P. "Use of metallic calcium in gas analysis" IX Congr. intern, quim. pura aplicada (Madrid), vol. Date 1934, 6,225–36. 1936.*

English Translation of Dafert, F.W., et al., "Uber einige neue Verbindungen von Stick–stokk und Wasserstoff mit Litium", Diese Sitzungsberichte, Bd. CXVIII, Bat. Lib, Jul. 1910.*

Dafert, F.W. et al., *"Uber einige neue Verbindungen von Stick–stoff and Wasserstoff mit Lithium"*, Diese Sitzungsberichte, Bd. CXVIII, Abt. Iib, Jul. 1910, pp. 981–996.

Ruff, Otto et al., *"Uber das Lithium–imid und einige Bemerkungen zu der Arbeit von Dafert und Miklauz: Über einige neue Verbindungen von Stickstoff und Wasserstoff mit Lithium"*, Anorganischen und elektrochemischen Laboratorium der Kgt. Techn. Hochschule Danzig, Feb. 13, 1911, pp. 502–506.

Weitkamp, Jens et al., *"Nitrido–Sodalite $Zn_6[P_{12}N_{24}]$ as a Material for Reversible Hydrogen Encapsulation"*, Advanced Materials vol. 9, No. 3, Nov. 5, 1996, pp. 247–248.

* cited by examiner

Primary Examiner—Stanley S. Silverman
Assistant Examiner—Maribel Medina
(74) Attorney, Agent, or Firm—Klarquist Sparkman, LLP (57) ABSTRACT

Metal-N-based or metalloid-N-based materials absorb a substantial amount hydrogen and are useful as hydrogen storage materials for various applications such as hydrogen fuel cell technology.

41 Claims, 8 Drawing Sheets

METHOD FOR REVERSIBLE STORAGE OF HYDROGEN AND MATERIALS FOR HYDROGEN STORAGE

This application is related to U.S. Provisional Patent Application Ser. No. 60/330,802, filed Oct. 31, 2001, entitled "Method for reversible storage of hydrogen and materials for hydrogen storage", the contents of which are hereby incorporated by reference.

FIELD OF INVENTION

The present invention relates to hydrogen storage materials. The present invention also relates to a method of reversible storage of hydrogen in solid-state materials.

BACKGROUND OF INVENTION

Hydrogen-based energy is the cleanest of the currently known energy sources, and it will undoubtedly play a part in the energy supply of this century. Heavy environmental pollution due to combustion of fossil fuel and depletion of non-renewable energy sources emerge as two serious problems. Hydrogen-based energy sources are considered to be the most promising candidates for solving these problems, as this kind of energy can replace fossil fuel in most applications. The biggest challenge in on-board hydrogen utilisation (i.e. as fuel for vehicle, portable computer, phone, etc.) is the low hydrogen storage capacity that existing systems possess. Development of hydrogen storage media is of great importance and research on this area is quite active throughout the world.

Currently, there are four systems for hydrogen storage [1, 2]: Liquid hydrogen, Compressed hydrogen gas, Cryo-adsorption system, and Metal hydride systems.

Applications of hydrogen in pure form (liquid hydrogen or compressed hydrogen gas) are mostly utilised for large-scale or stationary purposes, since the weight of containers for hydrogen is normally too prohibitive for uses where hydrogen is used in limited scope. For vehicular or any other portable applications, hydrogen stored in solid-state materials seems to be the best solution. Thus, cryo-adsorption systems and metal hydride systems are the two most promising systems.

The cryo-adsorption systems show advantages in moderate weight and volume. In this system, hydrogen molecules are physically bound to the surface of activated carbon at liquid nitrogen temperature. Under optimised conditions, the hydrogen storage capacity of activated carbon may reach 7 wt % based on the weight of activated carbon. The disadvantages of this system relate to the critical conditions required (i.e. cryogenic conditions).

Metal hydrides have been proposed as systems for hydrogen storage. Hydrogen is chemisorbed by metal or metal alloys with corresponding formation of metal hydrides. Two categories of metal alloys have been extensively explored: I) $AB_5$ type, and ii) $A_2B$ type. $LaNi_5$ is a good example of the first category. One molecule of $LaNi_5$ can absorb about 6 hydrogen atoms at ambient temperature and high pressures to form $LaNi_5H_6$. Subsequent discharge of hydrogen can be achieved by reducing the hydrogen pressure. In this system, the hydrogen storage capacity is less than 1.5 wt %. The advantages of this type of metal alloy lie in the quick kinetics of hydrogen charge/discharge and the very good density of the materials, but the hydrogen storage capacity is unacceptable. $Mg_2Ni$ illustrates the $A_2B$ type of metal alloy. This kind of metal alloy can store more than 4 wt % of hydrogen, but suffers from higher operating temperature (above 300° C. for desorption, with an equilibrium hydrogen pressure of up to 1.0 bar), slow hydrogen charge and discharge kinetics and relatively low density. More recently, much effort has been made on material engineering of these metal alloys [3, 4], but no significant improvement has been made. Furthermore, the high cost of the metal alloys is another drawback.

BRIEF SUMMARY OF THE INVENTION

Surprisingly, metal-nitrogen-based or metalloid-nitrogen-based compounds used in the present invention exhibit remarkable hydrogen storage capacity at lower temperatures and/or pressures than prior art systems. This non-cryogenic hydrogen storage is reversible, so the materials of the present invention are candidates for hydrogen sources in a variety of applications, including applications mentioned above.

According to one aspect of the invention, there is provided a process for reversibly absorbing hydrogen, wherein a metal-nitrogen or a metalloid-nitrogen compound is contacted with a hydrogen-containing atmosphere, at a temperature and under a hydrogen pressure that permits hydrogen absorption.

According to another aspect of the invention, there is provided a hydrogen reservoir containing a metal-nitrogen or a metalloid-nitrogen compound that bears absorbed hydrogen or is capable of bearing absorbed hydrogen.

Hydrogen is reversibly stored, preferably under moderate to low temperatures and pressures. Preferably, the hydrogen-absorbing compound (hydrogen sorbent) is a metal-nitrogen-based or metalloid-nitrogen-based compound in the solid state.

The metal or metalloid used can be any element that will combine with a nitrogen-containing moiety to form a compound that will absorb hydrogen. Suitable metals include alkali metals (e.g. lithium (Li), sodium (Na), potassium (K) or cesium (Cs)), alkaline earth metals (e.g. beryllium (Be), magnesium (Mg) or calcium (Ca)), aluminum (Al), metalloids (e.g., silicon (Si), Gallium (Ga), Germanium (Ge), or transition metals (e.g. titanium (Ti), nickel (Ni), cobalt (Co), copper (Cu), chromium (Cr), iron (Fe), molybdenum (Mo), zinc (Zn)). Preferably, the metal is lithium, calcium, titanium, aluminum or silicon, more preferably used in the form of a ternary nitride or an imide.

Particularly preferred metal-nitrogen-based compounds are lithium-nitrogen-based. For example, Li—N-based solid state materials may comprise Li—N, and Li—N—H type structures. Preferred compounds of these types are, for example, lithium nitride ($Li_3N$), lithium amide ($LiNH_2$) lithium imide ($Li_2NH$ and $Li_4NH$) and Li-enriched lithium imide ($Li_mNH_n$, 2<m<3, 0<n<1, m+n=3). The lithium and hydrogen atoms in this series of Li-enriched lithium imide compounds can substitute each other in the lattice, and this results in a slightly changed lattice. This series of compound can be regarded as a solution of Li and H in the lattice of lithium imide.

The lithium-nitrogen-based compounds may be mixed with lithium hydride. Lithium-nitrogen-based compounds admixed with LiH preferably have a Li—N to Li—H molar ratio of about 1000:1 to about 1:10.

The metal-nitrogen-based compounds may also be mixed with a carbon material. The carbon material used can be in any convenient form, for example graphite, carbon nanotubes, carbon nanofibers, activated carbon, a fullerene or carbon powders. Metal-nitrogen-based compounds admixed with carbon preferably have a metal to carbon molar ratio of about 10000:1 to about 1:3.

Metal-nitrogen-based compounds may also be mixed with a metal or metalloid dopant. The doping involves the introduction of one or more additional elements, for doping, into the metal-nitrogen compound. The preferred dopants are metal or metalloid elements from Periodic Table groups 1 to 13, Lanthanides and C, Si, Ge, P, O, S, Sn, F and Cl. More preferably, the doped elements are Be, Mg, Ca, B, Al, Ti, Cr, Mn, Fe, Co, Ni, Cu, Zn, Pt and Pd. The dopant can be a pure metal or pure metalloid, a mixture of metals or of metalloids or a compound that comprises one or more metals or one or more metalloids. Metal-nitrogen based or metalloid-nitrogen-based compounds doped in the above fashion preferably have a metal-nitrogen based compound or metalloid-nitrogen-based to dopant molar ratio of about 1000:1 to about 1:1.

The admixture of dopants with a metal-nitrogen-based compound can lead to physical mixtures or new compounds, both of which are effective for the absorption and desorption of hydrogen. In the application, the term compound is given a broad meaning, such as the result formed by a union of elements or parts especially, but not exclusively, a distinct substance formed by chemical union of two or more ingredients in definite proportion by weight.

Particularly preferred metal-nitrogen-based or metalloid-nitrogen-based compounds are ternary or higher nitrides. Elements in the ternary or higher nitrides are selected from the metal and metalloid elements of Periodic Table groups 1 to 13, lanthanides, C, Si, Ge and Sn. More preferably, elements in the ternary or higher nitrides are selected from Li, Be, Mg, Ca, B, Al, Ti, Cr, Mn, Fe, Co, Ni, Cu and Zn.

Preferred ternary nitrides include Li-based ternary nitrides.

Other preferred metal-nitrogen-based compounds are calcium-nitrogen-based compounds. The compounds may comprise a Ca—N or a Ca—N—H type structure. Such compounds include calcium nitride ($Ca_3N_2$) and calcium amide/imide ($CaNH/Ca_2NH$).

Other preferred metal-nitrogen-based compounds are aluminium-nitrogen-based compounds. The compounds may comprise an AlN, or Al—N—H type structure. Such compounds include aluminium nitride (AlN), aluminium ammonia adducts and derivatives such as $AlNH_6$, $AlNH_4$, $AlNH_3$ and $AlNH_2$.

Other preferred metalloid-nitrogen-based compounds are silicon-N-based, gallium-Nitrogen and germanium-nitrogen-based compounds. Such compounds include $Si_3N_4$, GaN, and $Ge_3N_4$.

Of the factors that govern the suitable conditions for absorption and desorption, temperature and hydrogen pressure are important. At lower temperatures, hydrogen absorption can be efficiently carried out under lower hydrogen pressure, and so can the hydrogen desorption. At higher temperature, the overall pressure for $H_2$ absorption and desorption will increase. In either case, most of hydrogen can be released from the material when vacuum is applied. Absorption and desorption of hydrogen is hence dependent on temperature and its corresponding hydrogen pressure at equilibrium.

In a preferred method to absorb hydrogen, the solid-state metal-nitrogen-based or metalloid-nitrogen-based compounds may be exposed to a hydrogen-containing atmosphere, which is preferably free of contaminants, particularly oxygen, at a temperature from about −50° C. to about 80° C. and a pressure from about 0.01 mbar to about 500 bar. More preferably, the temperature is from about 0° C. to about 700° C. It is particularly preferred that the temperature at which absorption is carried out be 220° C. or less. The hydrogen pressure is more preferably from about 1.0 mbar to about 200 bar, even more preferably from 1.0 mbar to about 100 bar. The hydrogen-containing atmosphere comprises hydrogen, and possibly other gaseous constituents, such as inert carriers gases, for example argon.

Desorption of hydrogen from the hydrogen storage material is preferably achieved at a temperature of from about 0° C. to about 800° C. under a hydrogen pressure of from about $10^{-8}$ mbar to about 100 bar. Desorption may be assisted by passage over the sorbent of a stream of an inert gas, for example argon.

In the description, the term "absorbed" is not necessarily used in the strict scientific sense, as hydrogen may be held by absorption, in a strict sense, by adsorption, in a strict sense, by chemisorbtion, in a strict sense, or by the combination of two or three of these mechanisms.

Additional features and advantages of the invention will be set forth in the description that follows, and in part will be apparent from the description or may be learned by practice of the invention. These variations are considered to be in the scope of the invention. The objects and other advantages of the invention will be realised and attained by the structure particularly pointed out in the written description and claims hereof as well as the appended Figures.

DETAILED DESCRIPTION OF THE INVENTION

Nitrides can be synthesised by direct reaction between a metal or a metalloid and nitrogen gas [5]. The element used can be any metal or metalloid that will combine with a nitrogen-containing moiety to form a compound that will absorb hydrogen. At least one metal is preferably selected from an alkali metal (e.g. lithium (Li), sodium (Na), potassium (K) or cesium (Cs)), an alkaline earth metal (e.g. beryllium (Be), magnesium (Mg) or calcium (Ca)), aluminum (Al), a metalloid (e.g. boron (B), Si, Ga, Ge), or a transition metal (e.g. titanium (Ti), Nickel (Ni), Cobalt (Co), Copper (Cu), Chromium (Cr), Iron (Fe), molybdenum (Mo), zinc (Zn)). Most preferably, the metal is lithium, or calcium- or Al, or Li-based or Ca-based or Al-based ternary nitrides.

Lithium nitride is a red-brown colored compound. It has a density of about 1.27 g/ml, it decomposes at temperatures above 800° C., and it is unstable in air. Lithium imide ($Li_2NH$) is a gray-to-white colored substance. The density is around 1.1 g/ml, and it is unstable to moisture. Lithium amide ($LiNH_2$) is also a gray-to-white substance. It has a density of 1.18 g/ml and it is unstable to moisture. All of these compounds are commercially available.

Hydrogen Storage in $Li_3N$

Figure 1:
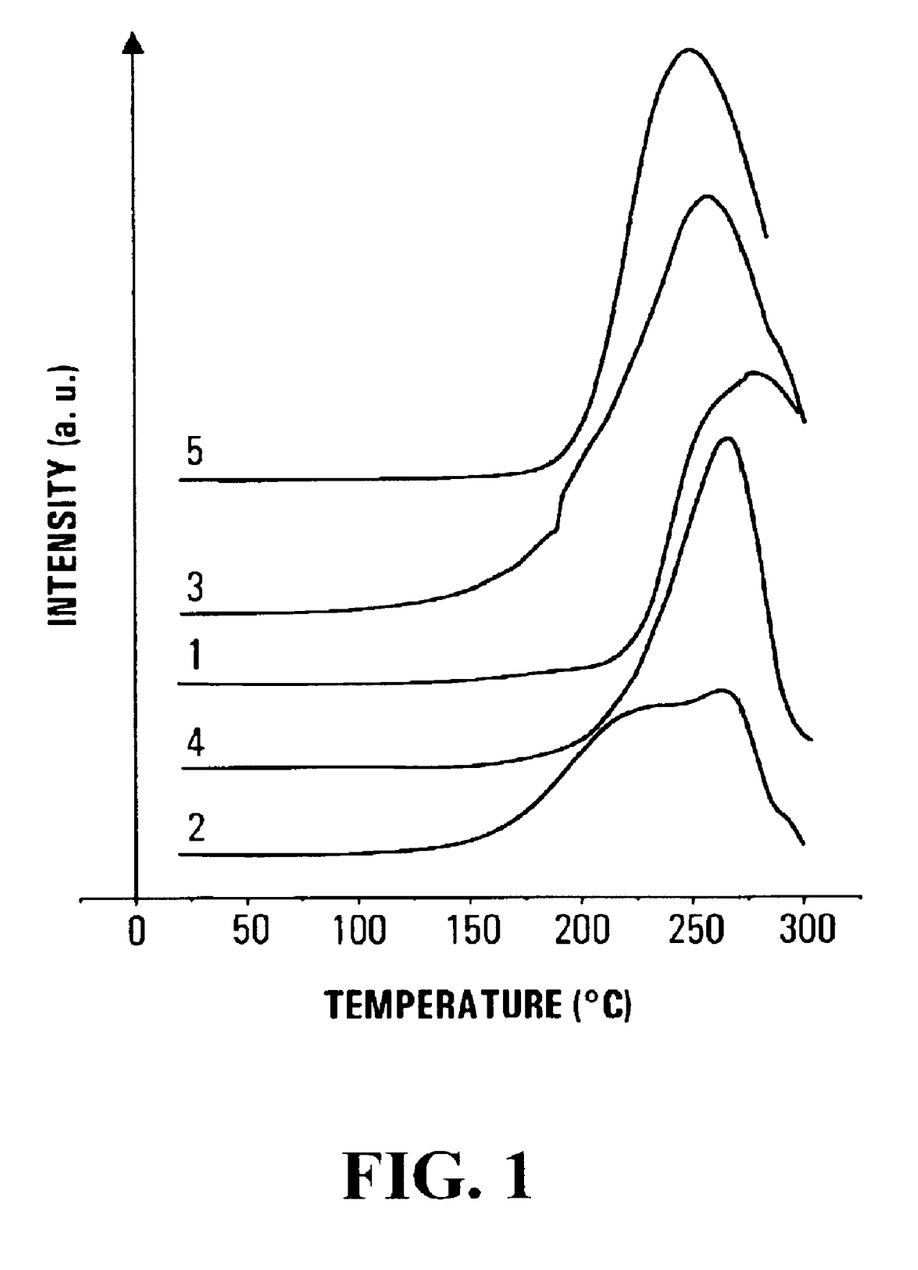
FIG. 1 displays Temperature Programmed Reaction (TPR) spectra of 1) $Li_3N$ 2) $Li_{2.2}NH_{0.8}$ 3) $Li_3N$—C (C/Li= 1/30) 4) $Li_3N$—LiH with $Li_3N/LiH=1/2$ 5) $Li_3N$—Ni with 10 wt % of Ni. 20% $H_2$+80% Ar was used as carrier gas, the partial pressure for $H_2$ is approximately 1 bar, for a total gas pressure of 5 bar. Temperature was raised from room temperature to 400° C. at 2° C./min. The X-axis represents temperature (in ° C.) and Y-axis is the intensity of the H-decrease signal.

The hydrogen absorption of lithium nitride was investigated by Temperature-Programmed-Reaction (TPR). Diluted hydrogen gas (20% $H_2$+80% Ar, the partial pressure of $H_2$ is around 1.0 bar) was passed through a $Li_3N$ sample at elevated temperatures. On-line Gas Chromatography (GC) and Mass Spectrometry (MS) were used to monitor the change of hydrogen content in the effluent gas during the test. FIG. 1-1 displays the TPR test results. It can be seen that hydrogen absorption by $Li_3N$ begins at a temperature of about 150° C. and peaks at 270° C., which demonstrates that $Li_3N$ has the capability to store hydrogen. Miklauz has reported [6] (D. Miklauz, Monatsh, 31, 981 (1910).) that the reaction between $Li_3N$ and hydrogen takes place at a temperature from 220° C. to 480° C. with the formation lithium amide.

The reaction path is similar to what we observe, but the temperature and pressure ranges utilized are different. Furthermore, Miklauz's earlier work regarding the reaction did not connect the reaction to the concept of hydrogen storage, and little investigation or attention was given to this reaction since 1911. Furthermore, rare attention has been paid to the reversed reaction, because it is well known that lithium amide ($LiNH_2$) will decompose to lithium imide and ammonia at higher temperatures. According to Georges' statement (Berichte d. D. Chem. Gesellschaft, 44, 502 (1911), ammonia was released from the mixture of $LiNH_2$ and LiH at temperature above 340° C. to 480° C. Surprisingly, we have discovered by TPR that reaction:

$$Li_3N + 2H_2 \text{---} > LiNH_2 + 2LiH \qquad (1)$$

can take place at temperatures lower than 220° C. The difference in the reacting temperature between Miklauz's and ours may be due to the effect of impurities in $Li_3N$. We have found that in samples highly contaminated by oxides or hydroxides, i.e. having a $Li_3N$ purity of around 80%, the starting temperature for reaction (1) increases to 300° C. It is therefore preferred that the absorbent shall not be contaminated with other materials, and shall have a purity of at least 90%, preferably at least 95%, or higher. The other possibilities that explain the discrepancy may lie in the pressure of $H_2$ used and the crystalinity of $Li_3N$. We noticed that at higher $H_2$ pressure, reaction (1) can be carried out at relatively lower temperature (below 220° C.) and with $Li_3N$ having a particle size of less than 1 micron, the reaction also takes place at lower temperatures. It is therefore preferred to use an absorbent in finely divided form, preferably of a particle size less than 25 microns, preferably less than 10 microns, and more preferably less then 1 micron.

Figure 2:
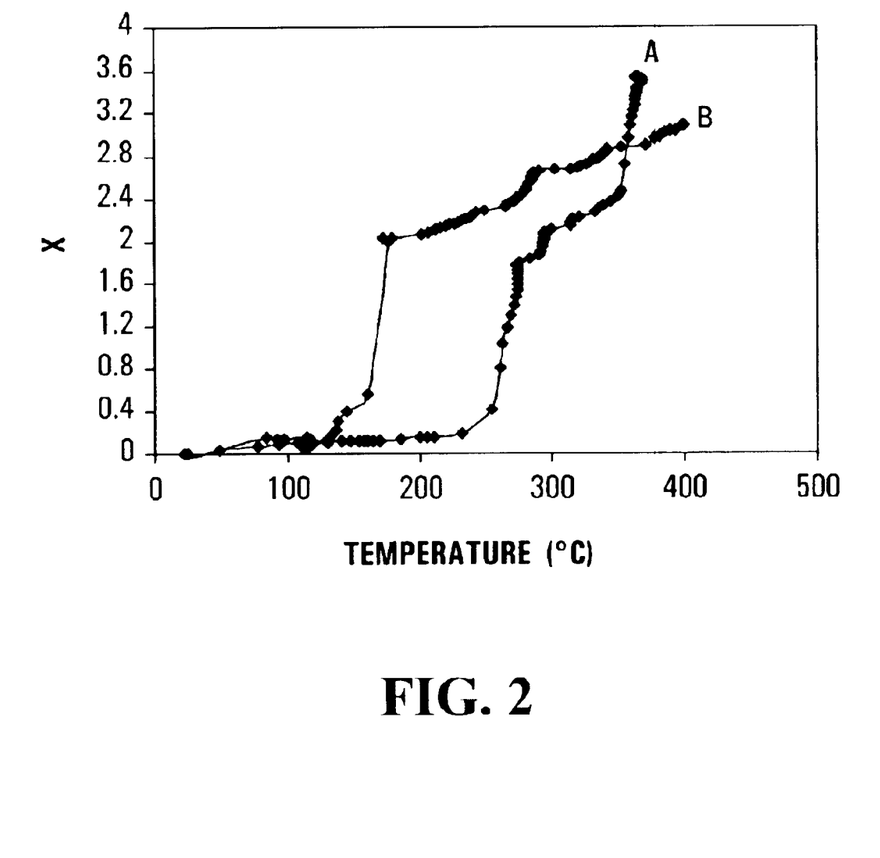
FIG. 2 displays the amount of hydrogen absorbed by (a) $Li_3N$ and (b) $Li_3N$+C with C/Li=1/13 with temperatures. The Y axis (X) represents the molar ratio of H to the sorbent. 30 bars of hydrogen were applied.

Theoretically, with all $Li_3N$ converting to amide and hydride, about 11.5 wt % of hydrogen can be stored. The Pressure-Composition-Isotherm measurements confirm this prediction (see FIG. 2-a). The vertical axis (X) refers to the molar ratio of absorbed H atom to $Li_3N$ molecule. From FIG. 2, it can be seen that X could reach up to 3.5 at temperature of about 250° C., which is equivalent to 10 wt % of $H_2$. As contamination is difficult to avoid, contaminants (for example lithium oxide and hydroxide) may occupy a certain amount of the sample weight, thus, X can be less than 4.0.

The reverse of the reaction of equation (1), i.e. the desorption of hydrogen from $LiNH_2$ and lithium hydride, can be achieved by decomposition of the material at a temperature from about 100° C. to 600° C. and a hydrogen pressure from about $10^{-8}$ to 100 bar. As tested by Temperature-Programmed-Desorption (TPD) (shown in FIG. 3-2), hydrogen desorption begins at a temperature of around 150° C. and peaks at 270° C. The desorbed hydrogen may come from the following reaction:

$$LiNH_2 + 2LiH \text{---} > Li_mNH_n + (4-n)/2 H_2 + (3-m)LiH \qquad (2)$$

($2 \leq m \leq 3$, $0 \leq n \leq 1$, m+n=3)

The value of the variables m and n depends on the temperature and pressure during the desorption process. At a low pressure or a high temperature, m is closer to 3 and n is closer to 0. $Li_mNH_n$ with 2<m<3, 0<n<1, m+n=3, is a novel compound. It has a structure similar to that of lithium imide, $Li_2NH$, as both are face-centered cubic and have closed lattice constants. We refer to the $Li_mNH_n$ compound as a Li-enriched imide, for which some of the H sites are taken over by Li within the normal imide lattice. The overall hydrogen charge and discharge processes can be described as:

$$Li_3N + H_2 \text{---} > LiNH_2 + 2LiH \text{-- } -H_2 \text{---} > Li_mNH_n \qquad (3)$$

($2 \leq m \leq 3$, $0 \leq n \leq 1$, m+n=3)

Figure 4:
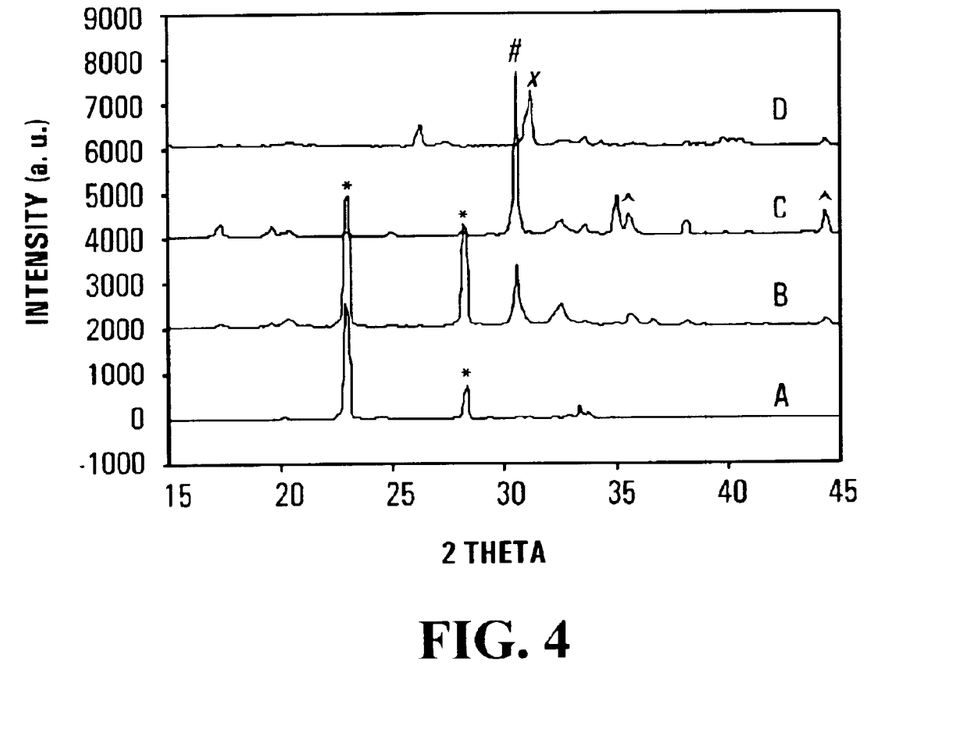
FIG. 4 displays the XRD spectra of (a) Pristine $Li_3N$, (b) half hydrogenated $Li_3N$ (180° C.), (c) Fully hydrogenated $Li_3N$, and (d) partially dehydrogenated $Li_3N$ (after desorption in Ar at 450° C.). Peaks marked with * are $Li_3N$; those marked with # are $LiNH_2$; those marked with X are $Li_2NH$; and those marked with ^ are LiH.
Figure 8:
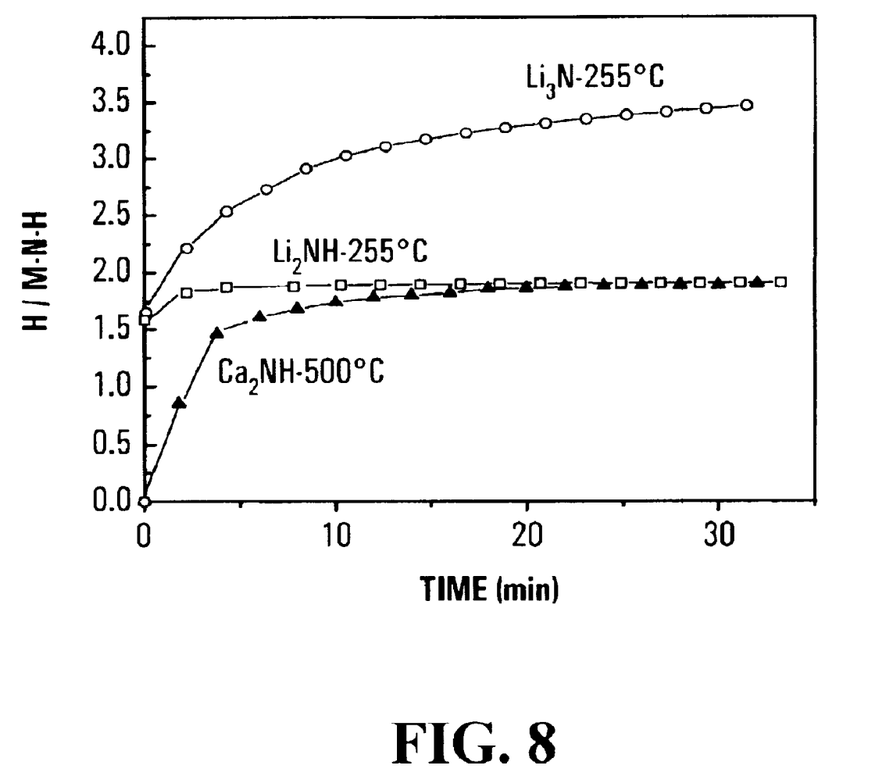
FIG. 8 displays the kinetics of hydrogen absorption in Li—N—H and Ca—N—H samples. Hydrogen pressure: ~30 bar; temperature for absorption: 255° C. for Li—N—H samples and 500° C. for Ca—N—H sample.

In situ X-ray Diffraction (XRD) was used to measure the phase transition during hydrogen absorption and desorption process of a $Li_3N$ sample. As shown in FIG. 4, before hydrogen absorption, only strong diffraction peaks assigned to $Li_3N$ and weak peaks to $Li_2O$ and LiOH are observed (FIG. 4a). As hydrogen absorption began, the $Li_3N$ phase became weakened and finally vanished and the amide and hydride phases situated at approximately 30.5°, 51°, 38°, 44°, respectively, developed (FIGS. 4b and 4c). On heating the sample in Ar atmosphere to 350° C., the peaks belonging to lithium amide weakened and those assigned to lithium-enriched imide developed (FIG. 4d). The hydrogen charge and discharge kinetics of this class of compounds is shown in FIG. 8.

Hydrogen Storage in $Li_mNH_n$

In the present invention, a new reaction between $Li_mNH_n$ and hydrogen was demonstrated to be a route for reversible hydrogen storage. $Li_mNH_n$, when m=2 and n=1, is the normal lithium imide with formula of $Li_2NH$. When 2<m<3, 0<n<1, m+n=3, $Li_mNH_n$ has a structure similar to that of lithium imide, $Li_2NH$ but with a constrained lattice. This compound is again referred to as Li-enriched imide. The reaction occurs when $Li_mNH_n$ reacts with hydrogen gas at a temperatures from about 0° C. to about 600° C. and under a hydrogen pressure from about $10^{-2}$ to about 500 bar:

$$Li_mNH_n + (m-1)H_2 \rightleftharpoons LiNH_2 + (m-1)LiH \quad (4)$$
$$(2 < m < 3, 0 < n < 1, m+n=3)$$

The reaction can go in either direction, depending on the temperature and hydrogen pressure. At a temperature in the range from about 50° C. to about 400° C. and a hydrogen pressure from about $10^{-2}$ mbar to about 500 bar, $Li_mNH_n$ reacts with hydrogen and forms lithium amide and lithium hydride. When the temperature is raised above about 50° C. and under inert gas atmosphere or under hydrogen pressure from about $10^{-8}$ bar to about 500 bar, lithium amide reacts with lithium hydride and forms $Li_mNH_n$, with hydrogen gas being liberated. The hydrogen storage capacity for $Li_mNH_n$ is more than 5 wt % depending on the value of m and n. The TPR result of hydrogenation of $Li_mNH_n$ is shown in FIG. 1(2), which clearly shows that hydrogen is absorbed at a temperature around 50° C. and peaks at about 260° C. The desorption of hydrogen, i.e., the reverse reaction of (4), occurs at a temperature around 150° C. and peaks at about 280° C. (see TPD results shown in FIG. 3-2). The hydrogen charge and discharge kinetics of this class of compounds is shown in FIG. 8.

Hydrogen Storage in Li—N—C System

A Li—N—C material can be prepared by either thoroughly mixing certain amount of carbon material into lithium metal and thereafter reacting the mixture with nitrogen gas or by directly mixing a lithium-nitrogen-based compound such as lithium nitride or $Li_mNH_n$ with carbon. The carbon material can be in any convenient form, such as carbon nanotubes, carbon nanofibers, graphite, activated carbon, fullerenes, carbon powder, etc. The C to Li molar ratio is preferably in the range of 3/1 to 1/10000, more preferably in the range of 1/1 to 1/1000. The mixing of carbon materials with lithium metal, lithium nitride or $Li_mNH_n$ may be achieved in any manner. A variety of methods are available, such as grinding or pounding with a mortar and pestle or milling in a mill, for example, a ball mill. A high-energy ball mill is such a mill that contains spherical objects inside of the mill that have a high frequency of vibration and rotation. Pounding of a certain amount of carbon into lithium metal or lithium nitride or $Li_mNH_n$ followed by pressing under inert or nitrogen atmosphere and at a temperature from about 0° C. to about 400° C. or by ball milling carbon and lithium or lithium nitride under inert or nitrogen atmosphere are particularly preferred methods on a bench scale. Mixing is preferably done until the mixture is as homogeneous as possible.

If carbon is added to the lithium instead of the lithium-nitrogen-based compound, the reaction between the Li—C mixture and nitrogen is carried out at temperature from about 0° C. to about 800° C. under a nitrogen pressure from 0.1 bar to about 100 bar.

Figure 3:
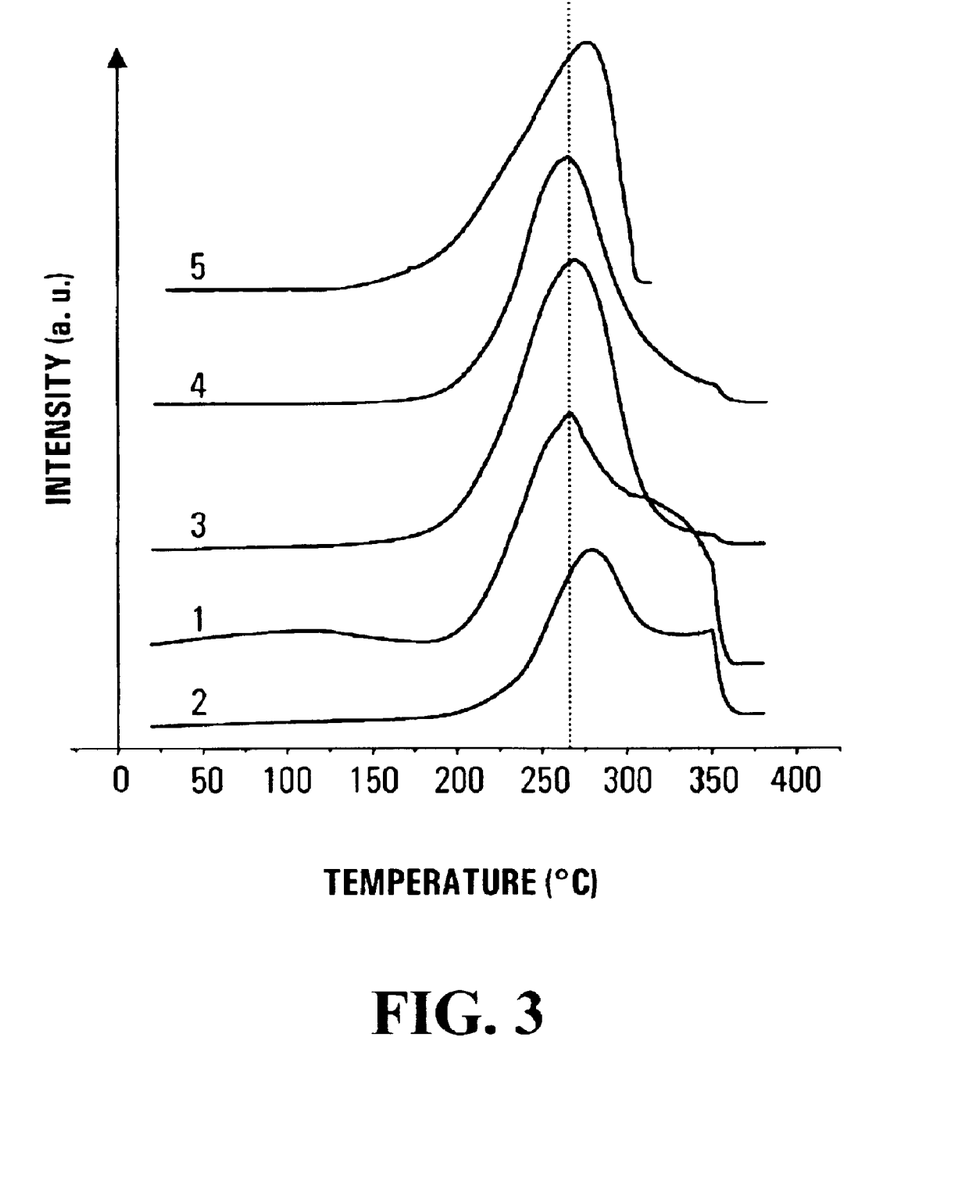
FIG. 3 displays the Temperature Programmed Desorption (TPD) spectra of 1) Hydrogenated Lithium Nitride 2) hydrogenated $Li_{2.2}NH_{0.8}$ 3) Hydrogenated $Li_3N$—C (C/Li=1/30), 4) Hydrogenated $Li_3N$—LiH with $Li_3N/LiH=1/2$, 5) Hydrogenated Ni-doped $Li_3N$— with 10 wt % of Ni. Absorption conditions: Hydrogen pressure 30 bar, temperature 250° C., time 1 h. The desorption was detected by heating the above sample in the gas stream of purified Ar. Mass Spectrometer was used to detect the effluent gases.

Hydrogen absorption in Li—N—C system may be achieved by exposing the Li—N—C compound to a hydrogen atmosphere at a temperature of from about −50° C. to about 600° C. under a hydrogen pressure from about $10^{-2}$ mbar to about 500 bar. The TPR measurement of Li—N—C system with C/Li=1/30 is shown in FIGS. 1–3. The hydrogen absorption begins at a temperature of around 50° C. and peaks at about 250° C. Under the flow of purified Ar, the desorption of the material after hydrogen storage begins at a temperature around 100° C. and peaks at about 270° C. as demonstrated by TPD measurement (FIG. 3-3). The total hydrogen storage capacity of the Li—N—C system was measured by Pressure-Composition-Isotherm (PCI) technique. As shown in FIG. 3-3, the Li—N—C sample with C/Li=1/30 can quickly absorb hydrogen at a temperature of about 180° C. and a hydrogen pressure of about 30 bar. The ratio of hydrogen atoms per molecule of metal-nitrogen compound (X) can reach approximately 3.0, which is equivalent to approximately 7 wt % of stored hydrogen.

Hydrogen Storage in Li—N—LiH System

The Li—N—LiH material can be prepared by thoroughly mixing $Li_3N$ or $Li_mNH_n$ with LiH. The $Li_3N$ or $Li_mNH_n$ to LiH molar ratio is preferably in the range of about 100/1 to about 1/10. The mixing of these two compounds can be carried out by any suitable means, such as ball milling or pounding with a mortar and pestle under inert gas atmosphere.

According to reactions (2) and (3), as the quantity of LiH is increased, the amount of hydrogen that can be desorbed also increases. Hydrogen absorption in Li—N—LiH system may be achieved by exposing Li—N—LiH to hydrogen atmosphere at a temperature of from about −50° C. to about 600° C. under a hydrogen pressure from about $10^{-2}$ mbar to about 500 bar. The TPR measurement of Li—N—C system with $Li_3N/LiH=1/2$ is shown in FIGS. 1–4. The hydrogen absorption begins at a temperature around 50° C. and peaks at about 250° C. The desorption of hydrogen begin at temperature around 100° C., and peaked around 270° C. (shown in FIGS. 3-4).

Hydrogen Storage in Metal Doped Li—N System

In this embodiment, the Li—N compound is modified by one or more doping metals. Several ways can be used for doping metal into $Li_3N$ or $Li_mNH_n$ including high-energy ball milling or calcination. Calcination entails heating the mixture of a metal, or of its compounds, and Li metal under nitrogen atmosphere at temperatures ranging from room temperature to 1500° C., under gas pressure of from 0.1 bar to 500 bar. Calcination can also be carried out by heating a mixture of a metal, or of its compounds, and $Li_3N$ or $Li_mNH_n$ under an inert gas or nitrogen atmosphere at temperatures ranging from room temperature to 1500° C., under gas pressure of from 0.1 bar to 500 bar. The dopant is selected from at least one metal or metalloid from the Periodic Table groups 1 to 13, and lanthanides, C, Si, Ge, P, O, S, Sn, F and Cl. More preferably, the dopant is selected from Be, Mg, Ca, B, Al, Ti, Cr, Mn, Fe, Co, Ni, Cu, Zn, Pt and Pd. The dopant can be provided in the form of compounds for example halides, oxide, nitrides, organometallic compounds etc). The molar ratio of $Li_3N$ or $Li_mNH_n$ to dopant metal or metalloid ranges from 1000/1 to 1/1.

Hydrogen absorption in metal or metalloid doped Li—N system may be achieved by exposing metal or metalloid-doped Li—N to a hydrogen atmosphere at a temperature of from about −50° C. to about 600° C. under a hydrogen pressure from about $10^{-2}$ to about 500 bar. The TPR measurement of Li—N—Ni system with $Li_3N/Ni=10/1$ is shown in FIGS. 1–5. The hydrogen absorption begins at a temperature of around 50° C. and peaks at about 230° C. The desorption of hydrogen begins at temperatures of around 100° C., and peaks at temperatures of around 220° C. and 270° C. (shown in FIGS. 3–5).

Hydrogen Storage in Ternary Nitride System

Ternary nitrides, preferably lithium ternary nitride Li—M—N (where M is the second metal in the ternary nitride) can be used as materials for hydrogen storage. M can be selected from any metal or metalloid element in periodic Table groups 1 to 13, lanthanides, C, Si, Ge and Sn. More preferably, M can be selected from Be, Mg, Ca, B, Al, Ti, Cr, Mn, Fe, Co, Ni, Cu and Zn. Having higher than a ternary metal nitride is also possible, for example $LiSr_2CoN_2$.

The admixture of lithium nitrides with another metal or metalloid can be pursued by high energy ball-milling of $Li_3N$ with a selected metal or metalloid under nitrogen atmosphere, or by calcination of mixtures of $Li_3N$ and the selected metal or metalloid under nitrogen atmosphere at temperatures of from 100 to 1500° C. under nitrogen pressure from 0.1 mbar to 500 bar. Calcination can also be carried out by heating Li—M, which is the mixture of metallic lithium and the selected metal or metalloid, under a nitrogen atmosphere at temperatures of from 30 to 1500° C., under a nitrogen pressure of from 0.01 mbar to 500 bar.

Hydrogen absorption in ternary nitrides may be achieved by exposing ternary nitrides to hydrogen atmosphere at a temperature of from about −50° C. to about 600° C. under a hydrogen pressure from about $10^{-2}$ mbar to about 500 bar.

There usually is a structural difference between metal doped Li—N system and a ternary nitride of similar compositions. After addition of the dopant, the base-nitride normally retains an unchanged lattice structure (i.e. $Li_3N$ has a hexagonal lattice structure, and Ca-doped $Li_3N$ is also hexagonal, possibly with a light lattice expansion or contraction). In a ternary nitride, there is always absolute structural changes (i.e. LiCaN is of anti-fluorite lattice structure).

Hydrogen Storage in Ca—N System

Figure 5:
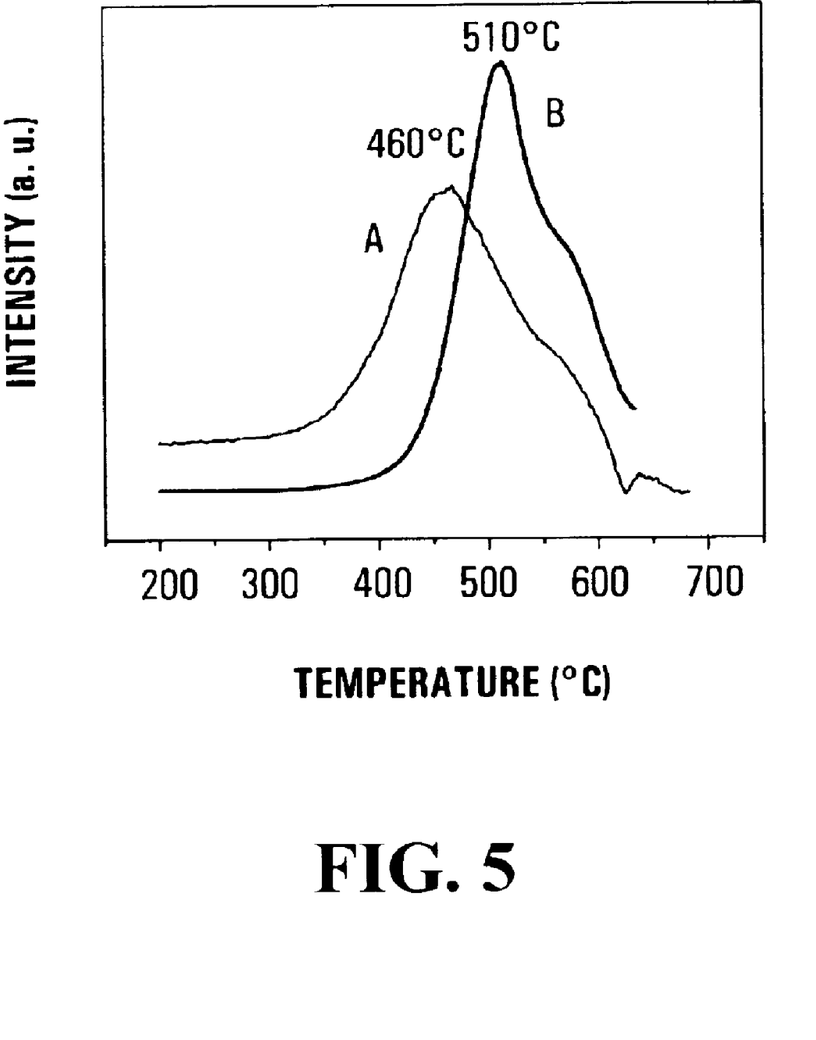
FIG. 5 displays the TPR and TPD profiles of $Ca_3N_2$. 20% $H_2$+80% Ar was used as carrier gas in the TPR process, and the partial pressure for $H_2$ was approximately 1 bar. In TPD process, purified Ar was applied as carrier gas. Temperature was raised from room temperature to 700° C. at 2° C./min.
Figure 6:
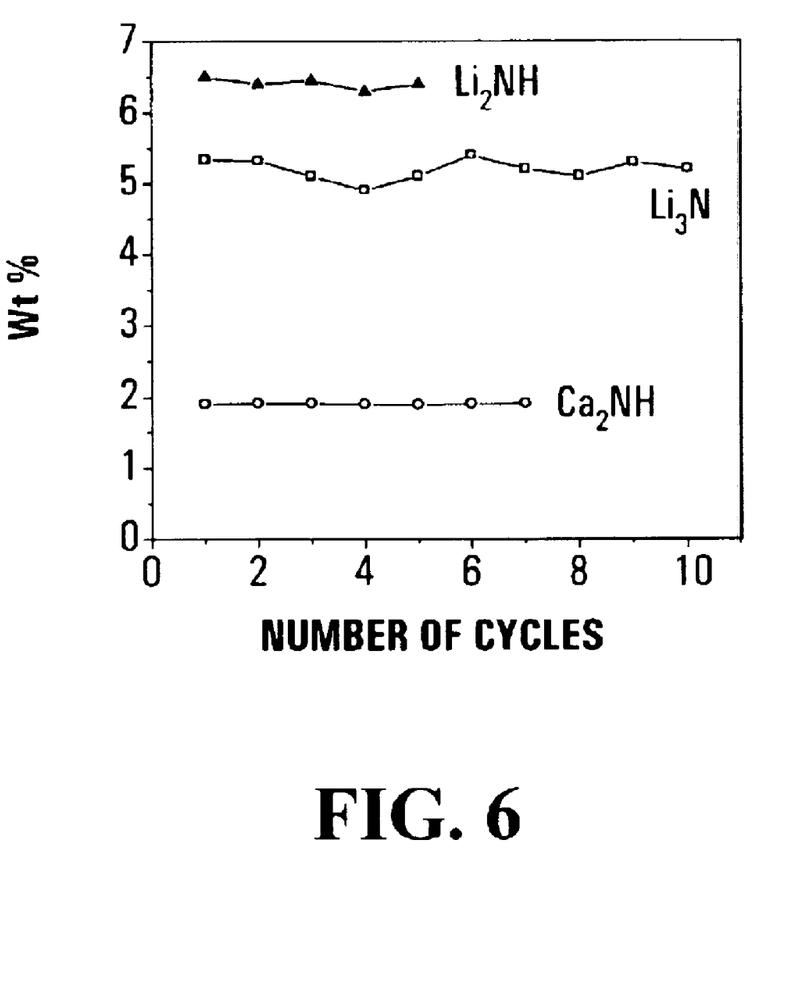
FIG. 6 displays the recyclability of $Li_3N$, $Li_2NH$ and $Ca_2NH$ samples. Samples underwent repeated cycles of absorption-desorption. Absorption conditions: 30 bars of hydrogen pressure, 250° C. for Li—N—H samples and 500° C. for Ca—N—H sample. Desorption conditions: Vacuum ($10^{-2}$ mbar), 250° C. for Li—N—H samples and 550° C. for Ca—N—H sample.

Calcium nitride ($Ca_3N_2$) and imide ($Ca_2NH$) can be used as hydrogen storage materials. Both materials are commercially available. According to the following reactions:

Hydrogen absorption in Ca—N system may be achieved by exposing $Ca_3N_2$ or $Ca_2NH$ to hydrogen atmosphere at a temperature of from about 100° C. to about 700° C. under a hydrogen pressure from about $10^{-2}$ mbar to about 500 bar. The desorption of hydrogen from hydrogenated Ca—N—H materials begins at temperature from 200 to 800° C. under hydrogen pressure from 0.01 mbar to 200 bar. The TPR measurement of $Ca_3N_2$ and $Ca_2NH$ were shown in FIG. 5. The hydrogen absorption (with hydrogen pressure ~1.0 bar) begins at a temperature around 250° C. and peaks at about 550° C. The desorption of hydrogen in purified Ar stream begins at temperature around 350° C., peaked around 550° C. (shown in FIG. 6. The hydrogen charge and discharge kinetics of this class of compounds is shown in FIG. 8.

Hydrogen Storage in Al—N—H Systems

Figure 7:
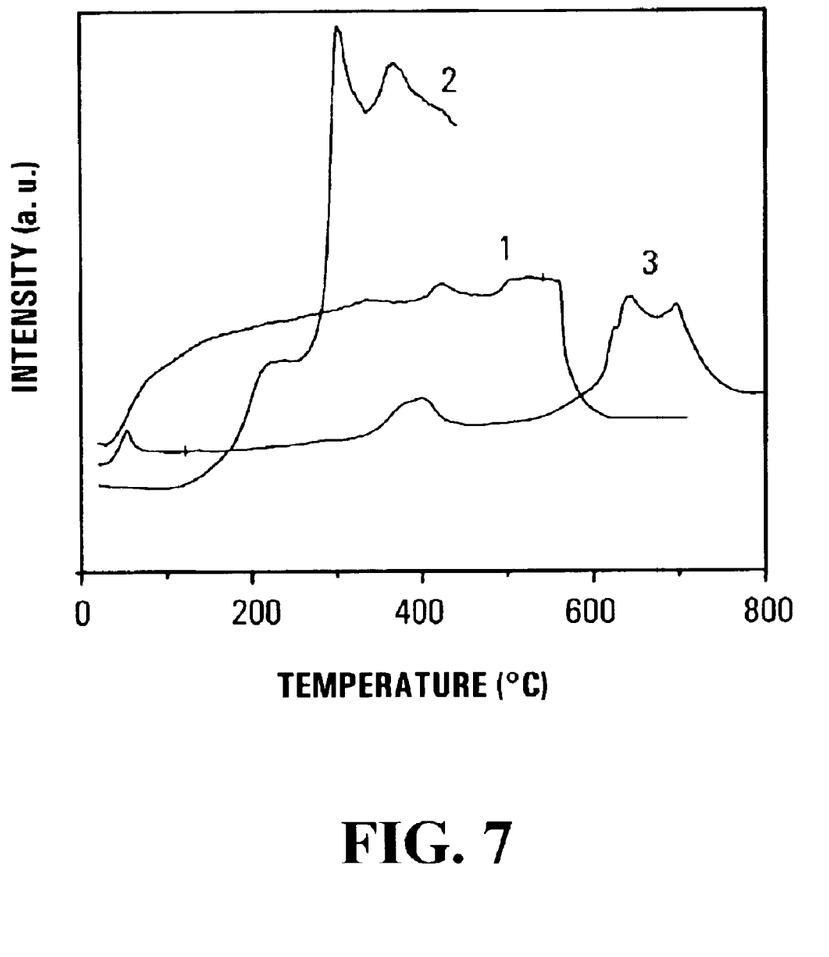
FIG. 7 displays the TPD profiles of Al—N—H (1), Ti—N—H (2) and Si—N—H (3). The desorption was detected by heating the above samples in the gas stream of purified Ar. Mass Spectrometry was used to detect the effluent gases.

Hydrogen can be reversibly stored in Al—N—H system at temperature of from −80° C. to 700° C. under hydrogen pressure of from 0.01 mbar to 40 bar. Hydrogen desorption from hydrogenated Al—N—H system occurs at temperature of from −50° C. to 800° C., and at hydrogen pressures of from $10^{-8}$ mbar to 200 bars. Al—N—H systems include aluminium nitride (AlN), aluminium hydride-ammonia adducts and their derivatives such as $AlNH_6$, $AlNH_4$, $AlNH_3$ and $AlNH_2$. Hydrogen storage in Al—N—H system may follow the processes of:

FIG. 7, curve 1, shows the Temperature-Programmed-Desorption spectrum of one of the hydrogenated Al—N—H sample, as can be seen, the hydrogen desorption begins at temperature just above, or even below, room temperature. In the whole testing period, there is continuous hydrogen desorption (temperature ranges from room temperature to 600° C.)

Hydrogen Storage in Ti—N—H Systems

Titanium nitride, TiNx, where x depends on the preparation methods, was found to be able to absorb $H_2$ at temperature from 25° C. to 700° C. under hydrogen pressure from 0.01 mbar to 500 bar. Preferably, the value for x is $0.3 \leq x \leq 1$. FIG. 7 curve 2 is the TPD feature of hydrogenated titanium nitride sample. It can be seen that hydrogen desorption begins at temperature below 100° C. and peaks around 200° C., 300° C., and 400° C.

Hydrogen Storage in Si—N-Based Systems

Hydrogen was found to be absorbed by $Si_3N_4$ at temperatures of from 0° C. to 600° C. under hydrogen pressure of 0.01 mbar to 500 bar. Desorption occurs at temperature range from 20° C. to 800° C. FIG. 7 curve 3 is the TPD profile of hydrogenated $Si_3N_4$.

The hydrogen sorbents described above can be used in any circumstances where hydrogen supply is needed. A preferred application of the sorbents is in hydrogen reservoirs. Applications for these reservoirs are numerous, for example as on-board hydrogen storage in hydrogen-energy-driven automobiles, ships, aircraft, missile etc . . . Another possible application for the sorbents is in a hydrogen fuel cell where, for example, the sorbents described above can supply the $H_2$. In addition, the hydrogen absorption and desorption reactions described above can be used to transport energy.

A hydrogen reservoir may comprise a container that contains the sorbent used in the invention. The container preferably bears one or more ports that permit the ingress of hydrogen during hydrogen absorption and that permit the egress of hydrogen during hydrogen desorption. The container can also use a single port with a reversible valve to permit both the ingress and the egress of the hydrogen. A person skilled in the art would have the knowledge and training suitable to design containers for use as hydrogen reservoirs.

The documents cited or referred to in the above discussion are hereby incorporated by reference.

The following specific examples are provided to illustrate the invention. It will be understood, however, that the specific details given in each sample have been selected for purpose of illustration and are not to be construed as a limitation on the invention. Generally, the experiments were conducted under similar conditions unless noted.

EXAMPLES

Example 1

0.8 gram $Li_3N$ was put into the sample cell of a Pressure-Composition-Isotherm (PCI) unit. The hydrogen storage capacity was determined by introducing 40 bar of hydrogen into the sample cell, which was preheated to 300° C. After 2 hours of absorption, about 10 wt % of hydrogen was absorbed. Desorption was performed by evacuating the PCI system to 0.1 mbar at a temperature of 350° C. for 2 hours. The amount of desorbed hydrogen was measured by re-absorption of hydrogen at 300° C. and under 30 bar of hydrogen for 2 hour. About 5.5 wt % of hydrogen was re-absorbed, which means that about 5.5 wt % of hydrogen was desorbed at 350° C.

Example 2

120 mg of graphite was admixed with 350 mg of lithium metal as homogeneously as possible. The mixture was then exposed to nitrogen gas at room temperature for 3 hours to form a Li—N—C sample. 0.5 gram of the Li—N—C sample was put into a PCI sample cell and an autosoak measurement was then done at 180° C. under a hydrogen pressure of 40 bar for 3 hours. About 7 wt % of hydrogen was absorbed. On desorbing at 350° C., about 3.5 wt % of hydrogen was released.

Example 3

60 mg of carbon nanotubes were admixed into 1.1 gram of lithium, then the same procedure as Example 1 was followed except, using an autosoak temperature of 250° C. About 9 wt % of hydrogen was absorbed. On desorbing at 300° C., about 4.5 wt % of hydrogen was released.

Example 4

0.9 gram of lithium imide was put into a PCI sample cell, and then submitted to the same procedure as described in Example 1, except that an autosoak temperature of 200° C. was used. About 6 wt % of hydrogen was absorbed. Desorption of hydrogen was performed by evacuating the sample to 0.1 mbar at 300° C. for 3 hours. The desorbed hydrogen was measured by re-absorption of hydrogen at 200° C. under hydrogen pressure of 30 bar for 3 hours. About 5.5 wt % was re-absorbed.

Example 5

0.5 g of aluminium doped $Li_3N$ ($Al/Li_3N=1/10$) was put into a PCI sample cell then Pressure-Composition-Isotherm (PCI) measurements were taken at 200° C. PCI measurement was done by introducing an aliquot of $H_2$ into the sample cell step-by-step until the hydrogen pressure reached 70 bar, in the meanwhile, calculating the amount of hydrogen absorbed by the material; then removing hydrogen from the cell gradually till pressure drops below 0.03 bar, and calculating the amount of desorbed hydrogen. ~8 wt % of hydrogen was absorbed. The desorbed hydrogen was ~4.4 wt %.

Example 6

500 mg of $Ca_3N_2$ was introduced into a PCI sample cell and Pressure-Composition-Isotherm measurements were taken at 550° C. Conditions for measurement are similar to those described in Example 5. ~4 wt % of hydrogen was absorbed and ~2 wt % of hydrogen was released.

Example 7

80 mg of LiH was admixed with 350 mg of lithium nitride as homogeneously as possible. The mixture was put into a PCI sample cell and an autosoak measurement was then done at 250° C. under a hydrogen pressure of 40 bar for 3 hours. About 8 wt % of hydrogen was absorbed. On desorbing at 300° C., about 4.2 wt % of hydrogen was released.

Example 8

Titanium doped $Li_3N$ ($Ti/Li_3N=1/10$) sample was prepared by ball-milling Ti metal and $Li_3N$ power for 10 hours. 0.5 g of the titanium doped $Li_3N$ was put into a PCI sample cell, and then Pressure-Composition-Isotherm (PCI) measurements were taken at 200° C. PCI measurement was done by introducing an aliquot of $H_2$ into the sample cell step-by-step until the hydrogen pressure reached 40 bar, in the meanwhile, calculating the amount of hydrogen absorbed by the material; then removing hydrogen from the cell gradually till pressure drops below 0.03 bar, and calculating the amount of desorbed hydrogen. About 7 wt % of hydrogen was absorbed. The desorbed hydrogen was about 3.5 wt %.

Example 9

$Li_3N$ and $Ca_3N_2$ in a molar ratio of 1/1 were ball milled for 10 hours to prepare a ternary LiCaN sample. 700 mg of the Li—Ca—N sample was put into a PCI sample cell and followed the same procedure as described in Example 1, except that a temperature of 250° C. was selected. About 3.0 wt % of hydrogen was absorbed and about 1.0 wt % of hydrogen can be recycled.

Example 10

$Li_3N$ and Ni in a molar ratio of 8/3 were ball milled for 10 hours and then calcinated at 780° C. for 24 hours to prepare a ternary $Li_{2.4}Ni_{0.3}N$ sample. 500 mg of $Li_{2.4}Ni_{0.3}N$ sample was put into PCI sample cell and followed the same procedure as described in Example 1 except that a temperature of 250° C. was selected. About 6.0 wt % of hydrogen was absorbed and about 3.0 wt % of hydrogen can be recycled.

To those skilled in the art, it is understood that many changes, modifications and variations can be made without departing from the spirit and scope of the present invention as claimed in the following claims.

References

1. H. Buchner, P. Pelloux-Gervais, M. Mullar, F. Grafwallner and P. Luger. Hydrogen and other alternative fuels for air and ground transportation. H. W. Pohl, Eds. (John Wiley & Sons, Chichester 1995). Chaps. 7–11.
2. J. Nitsch, W. Peschka, W. Schnurnberger, M. Fischer and H. Eichert. Hydrogen as an energy carrier. C. Winter and J. Nitsch, Eds. (Springer-Verlag. Berlin, 1988), Part B.
3. H. Imamura, N. Sakasai, T. Fujinaga, J Alloy Compd, 253, 34 (1997)
4. A. Zaluska, L. Zaluski, J. O. Strom-Olsen, Appli Phys A, 72, 157 (2001).
5. D. Miklauz, Monatsh, 31, 981 (1910).
6. N. R. Georges, Berichte d. D. Chem. Gesellschaft 44, 502 (1911).

What is claimed is:

1. A process for reversibly absorbing hydrogen, wherein a metal-nitrogen compound or a metalloid-nitrogen compound further comprising a dopant is contacted with a hydrogen containing atmosphere, at a temperature and under a hydrogen pressure which permits hydrogen absorption.

2. The process according to claim 1, wherein hydrogen is adsorbed at from about −50° C. to about 800° C. and a hydrogen pressure from about $10^{-2}$ mbar to about 500 bar.

3. The process according to claim 2, wherein the temperature is 220° C. or less.

4. The process according to claim 1, wherein the metal-nitrogen compound is of the formula $Li_mNH_n$, wherein $2 \leq m \leq 3$, $0 \leq n \leq 1$ and $m+n=3$.

5. The process according to claim 4, wherein the metal-nitrogen compound is $Li_3N$.

6. The process according to claim 4, wherein the metal-nitrogen compound is $Li_2NH$ or a Li-enriched lithium imide.

7. The process according to claim 4, wherein the $Li_mNH_n$ metal-nitrogen compound is in admixture with a carbon dopant in a molar ratio of Li to carbon of from 10000:1 to 1:3.

8. The process according to claim 4, wherein the $Li_mNH_n$ metal-nitrogen compound is in admixture with a metal or metalloid dopant in a molar ratio of $Li_mNH_n$ to metal dopant of from 1000:1 to 1:1.

9. The process according to claim 8, wherein the metal or metalloid dopant is an element of periodic table groups 1 to 13, a lanthanide element, C, Si, Ge, P, O, S, Sn, F or Cl.

10. The process according to claim 8, wherein the metal or metalloid dopant is Be, Mg, Ca, B, Al, Ti, Cr, Mn, Fe, Co, Ni, Cu, Zn, Pt or Pd.

11. The process according to claim 4, wherein the $Li_mNH_n$ metal-nitrogen compound is in admixture with a LiH additive in a molar ratio of $Li_mNH_n$ to LiH additive of from 100:1 to 1:10.

12. The process according to claim 1, wherein the metal-nitrogen or metalloid-nitrogen compound is a ternary or higher nitride based compound.

13. The process according to claim 12, wherein the ternary or higher nitride based compound comprises two or more elements independently selected from the metal and metalloid elements of Periodic Table groups 1 to 13, a lanthanide element, C, Si, Ge and Sn.

14. The process according to claim 12, wherein the ternary or higher nitride based compound comprises two or more elements independently selected from the group consisting of Li, Be, Mg, Ca, B, Al, Ti, Cr, Mn, Fe, Co, Ni, Cu and Zn.

15. The process according to claim 14, wherein at least one element is Li.

16. The process according to claim 1, wherein the metal-nitrogen compound is a Ca-N based compound selected from $Ca_3N_2$ and $Ca_2NH$.

17. A hydrogen reservoir containing a metal-nitrogen compound or a metalloid-nitrogen compound combined with a dopant that bears absorbed hydrogen or is capable of bearing absorbed hydrogen.

18. The hydrogen reservoir according to claim 17, wherein the metal-nitrogen compound is of the formula $Li_mNH_n$, wherein $2 \leq m \leq 3$, $0 \leq n \leq 1$ and m+n=3.

19. The hydrogen reservoir according to claim 18, wherein the metal-nitrogen compound is $Li_3N$.

20. The hydrogen reservoir according to claim 18, wherein the metal-nitrogen compound is $Li_2NH$ or a Li-enriched lithium imide.

21. The hydrogen reservoir according to claim 18, wherein the $Li_mNH_n$ metal-nitrogen compound is in admixture with a carbon dopant in a molar ratio of Li to carbon of from 10000:1 to 1:3.

22. The hydrogen reservoir according to claim 18, wherein the $Li_mNH_n$ metal-nitrogen compound is in admixture with a metal or metalloid dopant in a molar ratio of $Li_mNH_n$ to metal dopant of from 1000:1 to 1:1.

23. The hydrogen reservoir according to claim 22, wherein the metal or metalloid dopant is an element of periodic table groups 1 to 13, a lanthanide element, C, Si, Ge, P, O, S, Sn, F or Cl.

24. The hydrogen reservoir according to claim 23, wherein the metal or metalloid dopant is Be, Mg, Ca, B, Al, Ti, Cr, Mn, Fe, Co, Ni, Cu, Zn, Pt or Pd.

25. The hydrogen reservoir according to claim 18, wherein the $Li_mNH_n$ metal-nitrogen compound is in admixture with a LiH additive in a molar ratio of $Li_mNH_n$ to LiH additive is from 100:1 to 1:10.

26. The hydrogen reservoir according to claim 17, wherein the metal-nitrogen or metalloid-nitrogen compound is a ternary or higher nitride based compound.

27. The hydrogen reservoir according to claim 26, wherein the ternary or higher nitride based compound comprises two or more elements independently selected from the metal and metalloid elements of Periodic Table groups 1 to 13, a lanthanide element, C, Si, Ge and Sn.

28. The hydrogen reservoir according to claim 26, wherein the ternary or higher nitride based compound comprises two or more elements independently selected from the group consisting of Li, Be, Mg, Ca, B, Al, Ti, Cr, Mn, Fe, Co, Ni, Cu and Zn.

29. The hydrogen reservoir according to claim 28, wherein at least one element is Li.

30. The hydrogen reservoir according to claim 17, wherein the metal-nitrogen compound is a Ca-N based compound selected from $Ca_3N_2$ and $Ca_2NH$.

31. The hydrogen reservoir according to claim 17, wherein 5.5 wt % or more of desorbable hydrogen is adsorbed.

32. A process for reversibly absorbing hydrogen, wherein $Li_2NH$, a Li-enriched lithium imide, a ternary or higher nitride based compound or $Ca_2NH$ is contacted with a hydrogen containing atmosphere, at a temperature and under a hydrogen pressure which permits hydrogen absorption.

33. The process according to claim 32 wherein the $Li_2NH$ or the Li-enriched lithium imide is in admixture with a LiH additive in a molar ratio of $Li_mNH_n$ to LiH additive of from 100:1 to 1:10.

34. The process according to claim 32, wherein the ternary or higher nitride based compound comprises two or more elements independently selected from the metal and metalloid elements of Periodic Table groups 1 to 13, a lanthanide element, C, Si, Ge and Sn.

35. The process according to claim 32, wherein the ternary or higher nitride based compound comprises two or more elements independently selected from the group consisting of Li, Be, Mg, Ca, B, Al, Ti, Cr, Mn, Fe, Co, Ni, Cu and Zn.

36. The process according to claim 35, wherein at least one element is Li.

37. A hydrogen reservoir containing $Li_2NH$, a Li-enriched lithium imide, a ternary or higher nitride, or $Ca_2NH$, that bears absorbed hydrogen or is capable of bearing absorbed hydrogen.

38. The hydrogen reservoir according to claim 37, wherein the $Li_2NH$ or the Li-enriched lithium imide is in admixture with a LiH additive in a molar ratio of $Li_mNh_n$ to LiH additive is from 100:1 to 1:10.

39. The hydrogen reservoir according to claim 37, wherein the ternary or higher nitride based compound comprises two or more elements independently selected from the metal and metalloid elements of Periodic Table groups 1 to 13, a lanthanide element, C, Si, Ge and Sn.

40. The hydrogen reservoir according to claim 37, wherein the ternary or higher nitride based compound comprises two or more elements independently selected from the group consisting of Li, Be, Mg, Ca, B, Al, Ti, Cr, Mn, Fe, Co, Ni, Cu and Zn.

41. The hydrogen reservoir according to claim 40, wherein at least one element is Li.

* * * * *

UNITED STATES PATENT AND TRADEMARK OFFICE
CERTIFICATE OF CORRECTION

PATENT NO. : 6,946,112 B2
DATED : September 20, 2005
INVENTOR(S) : Ping Chen et al.

It is certified that error appears in the above-identified patent and that said Letters Patent is hereby corrected as shown below:

Column 3,
Lines 64 and 65, "…from about -50° C. to about 80° C. …" should read
-- …from about -50° C. to about 800° C. … --.

Signed and Sealed this

Fourteenth Day of March, 2006

JON W. DUDAS
*Director of the United States Patent and Trademark Office*